United States Patent Office 3,124,575
Patented Mar. 10, 1964

3,124,575
DERIVATIVES OF DIHYDRO-2H-PYRIDO(2,3-E)-1,2,4-THIADIAZINE-1,1-DIOXIDE
Lincoln Harvey Werner, Summit, and George de Stevens, Willow Knoll, New Providence, N.J., assignors to Ciba Corporation, a corporation of Delaware
No Drawing. Filed Oct. 23, 1958, Ser. No. 769,066
9 Claims. (Cl. 260—243)

The present invention concerns sulfamyl-pyridine derivatives. More particularly, it relates to 3,4-dihydro-2H-pyrido[2,3-e]-1,2,4 - thiadiazine - 1,1-dioxides, which contain a sulfamyl group and, preferably, an additional substituent in the pyridine portion of the 3,4-dihydro-2H-pyridol[2,3-e]-1,2,4-thiadiazine-1,1-dioxide nucleus, the acylated derivatives and salts thereof. This group may be represented by the 7-sulfamyl-3,4-dihydro-2H-pyrido-[2,3-e]-1,2,4-thiadiazine-1,1-dioxides of the formula:

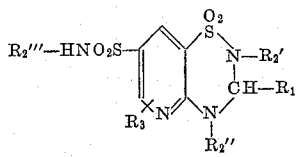

in which $R_1$ represents hydrogen, a lower aliphatic hydrocarbon, a substituted lower aliphatic hydrocarbon, a carbocyclic aryl, a substituted carbocyclic aryl, a carbocyclic aryl-lower aliphatic hydrocarbon, a substituted carbocyclic aryl lower aliphatic hydrocarbon, a heterocyclic or a heterocyclic-lower aliphatic hydrocarbon radical, each of the radicals $R_2'$, $R_2''$ and $R_2'''$ stands for hydrogen, lower aliphatic hydrocarbon and substituted lower aliphatic hydrocarbon, and $R_3$ represents hydrogen, lower aliphatic hydrocarbon or halogen, the acylated derivatives thereof and the salts of such compounds.

Apart from representing hydrogen, $R_1$ may stand for a lower aliphatic hydrocarbon radical, such as lower alkyl, e.g. methyl, ethyl, propyl, isopropyl, butyl, isobutyl, secondary butyl, tertiary butyl, pentyl, isopentyl, neopentyl, etc.; lower alkenyl, e.g. vinyl or 1-propenyl; or lower alkinyl, e.g. ethinyl; a carbocyclic aryl radical, such as monocyclic or bicyclic carbocyclic aryl, e.g. phenyl, 1-naphthyl or 2-naphthyl; a carbocyclic aryl-lower aliphatic hydrocarbon radical, such as monocyclic carbocyclic aryl-lower alkyl or bicyclic carbocyclic aryl-lower alkyl, e.g. benzyl, 2-phenyl-ethyl, naphthyl-1-methyl or naphthyl-2-methyl; a heterocyclic radical, particularly a monocyclic heterocyclic radical, such as furyl, e.g. 2-furyl; thienyl, e.g. 2-thienyl; or pyridyl, e.g. 2- or 4-pyridyl; a bicyclic heterocyclic radical, such as 6-quinolyl or 3,4-methylene-dioxy-phenyl; or a monocyclic heterocyclic-lower alkyl radical, such as, for example, thenyl, e.g. 2-thenyl. These radicals may contain additional substituents; aromatic or heterocyclic portions may be substituted by lower alkyl, e.g. methyl; hydroxyl; lower alkoxy, e.g. methoxy; mercapto; lower alkyl mercapto, e.g. methyl-mercapto; sulfamyl; tertiary amino, e.g. dimethylamino; or halogen, e.g. chlorine or bromine; $R_1$ may, therefore, be represented, for example, by 4-chloro-phenyl, 3,4-dichloro-phenyl, 4-methoxy-phenyl, 3,4,5-trimethoxy-phenyl, 3-methyl-phenyl, 4-chloro-benzyl, 3,4-dichloro-benzyl, 4-methoxy-benzyl, 3,4,5-trimethoxy-benzyl, 3-methyl-benzyl, 2-methyl-4-pyridyl or similar substituents. Lower aliphatic hydrocarbon radicals may contain hydroxyl; lower alkoxy, e.g. methoxy or ethoxy; tertiary amino, e.g. dimethylamino or diethylamino; or halogen, e.g. chlorine or bromine, as further substituents; $R_1$ may, therefore, be represented, for example, by chloromethyl, trichloromethyl, methoxy- or ethoxymethyl or similar substituents.

The radicals $R_2'$, $R_2''$ and $R_2'''$, apart from being hydrogen, may represent lower aliphatic hydrocarbon radicals, such as lower alkyl, e.g. methyl, ethyl, propyl or isopropyl; or these radicals containing substituents such as those specifically mentioned for the radical $R_1$; substituted radicals are, for example, hydroxy-ethyl or similar radicals.

The radical $R_3$ stands primarily for a lower aliphatic hydrocarbon radical, such as, lower alkyl, e.g. methyl, or halogen, e.g. chlorine or bromine.

Acylated derivatives are those containing acyl radicals of organic carboxylic acids, particularly of lower aliphatic carboxylic acids, such as, for example, carbonic acids, e.g. ethyl carbonic acid, or lower alkanoic acids, e.g. acetic or propionic acid. Other organic carboxylic acids, are, for example, carbocyclic aryl carboxylic acids, particularly monocyclic carbocyclic aryl carboxylic acids, e.g. benzoic or substituted benzoic acids; or monocyclic carbocyclic aryl-lower alkanoic acids, e.g. phenyl-acetic acid. Mono- or poly-acylated products may be formed.

Salts of the new compounds of this invention are therapeutically useful salts with metals, particularly the alkali metal salts, such as those with sodium or potassium. Mono- or polysalts may be formed.

The new 3,4-dihydro-2H-pyrido[2,3-e]-1,2,4-thiadiazine-1,1-dioxides of this invention show diuretic and natriuretic effects and may be used as diuretic and natriuretic agents to relieve excessive water and/or salt retention, for example, in connection with heart or kidney diseases. They may also have antihypertensive effects, which may be utilized to relieve states of hypertension. Generally, a valuable diuretic, natriuretic and anti-hypertensive effect can be obtained with 6-lower alkyl-7-sulfamyl-3,4-dihydro-2H-pyrido[2,3-e]-1,2,4-thiadiazine - 1,1-dioxides, or with 6-halogeno-7-sulfamyl-3,4-dihydro-2H-pyrido-[2,3-e]-1,2,4-thiadiazine-1,1-dioxides, in which the sulfamyl group may be unsubstituted or substituted. Particularly pronounced effects are exhibited by the 3,4-dihydro-2H-pyrido[2,3-e]-1,2,4-thiadiazine-1,1-dioxides of the formula:

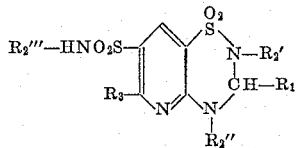

in which $R_1$ stands for hydrogen, lower alkyl, halogeno-lower alkyl, monocyclic carbocyclic aryl, or monocyclic carbocyclic aryl-lower alkyl, $R_2'$, $R_2''$ and $R_2'''$ represent hydrogen or lower alkyl, e.g. methyl, and $R_3$ represents lower alkyl. Representing this group of compounds are the 3,4-dihydro-2H-pyrido[2,3-e]-1,2,4-thiadiazine-1,1-dioxides of the formulae:

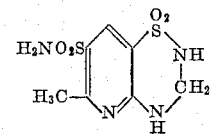

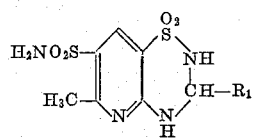

in which $R_1$ stands for lower alkyl;

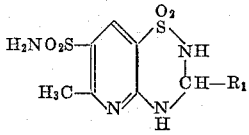

in which $R_1$ stands for halogeno-lower alkyl; and

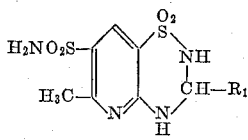

in which $R_1$ stands for monocyclic carbocyclic aryl-lower alkyl, and those derivatives of these compounds, in which one, two or all three of the nitrogen atoms are substituted by lower alkyl, particularly methyl. Acylated 3,4-dihydro-2H-pyrido[2,3-e]-1,2,4-thiadiazine derivatives are particularly those acylated with acyl radicals of carbonic acids, e.g. ethyl carbonic acid, or lower alkanoic acids, e.g. acetic acid.

The new compounds may be used as medicaments in the form of pharmaceutical preparations, which contain the new 3,4-dihydro-2H-pyrido[2,3-e]-1,2,4-thiadiazine-1,1-dioxides in admixture with pharmaceutical organic or inorganic, solid or liquid carriers suitable for enteral, e.g. oral, or parenteral administration. For making up the preparations there may be employed substances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be in solid form for example, as tablets, dragees or capsules, or in liquid form, for example, as solutions, suspensions or emulsions. If desired, such preparations may contain auxiliary substances, such as preserving agents, stabilizing agents, wetting or emulsifying agents, salts for varying the osmotic pressure or buffers. They may also contain, in combination, other therapeutically useful substances; for example, hypotensive agents, such as Rauwolfia or Veratrum alkaloids, e.g. reserpine, rescinnamine, deserpidine, germine or protoveratrine, synthetic hypotensive compounds, e.g. hydralazine, or ganglionic blockers, e.g. chlorisondamine.

The new 3,4-dihydro-2H-pyrido[2,3-e]-1,2,4-thiadiazine-1,1-dioxides of this invention, which contain as substituents an unsubstituted or substituted sulfamyl group and, preferably, an additional substituent in the pyridine portion of the heterocyclic nucleus may be prepared by reducing in pyrido[2,3-e]-1,2,4-thiadiazine-1,1-dioxides, which contain a sulfamyl group and, preferably, an additional substituent in the pyridine portion of the heterocyclic nucleus, the C=N-double bond of the 1,2,4-thiadiazine-1,1-dioxide portion, and, if desired, replacing in any resulting 3,4-dihydro-2H-pyrido[2,3-e]-1,2,4-thiadiazine-1,1-dioxide, containing sulfamyl-nitrogen atoms with hydrogen, such hydrogen by hydrocarbon, and/or, if desired, converting a resulting 3,4-dihydro-2H-pyrido[2,3-e]-1,2,4-thiadiazine-1,1-dioxide into its acylated derivatives, and/or, if desired, converting a resulting salt into a free compound, and/or, if desired, converting a free compound into a salt thereof. Thus the preparation of 7-(N-$R_2'''$-sulfamyl)-2 - $R_2'$-3-$R_1$-4-$R_2''$-3,4-dihydro-2H-pyrido[2,3-e]-1,2,4-thiadiazine-1,1-dioxides, in which $R_1$, $R_2'$, $R_2''$ and $R_2'''$ have the above-given meaning and which may contain $R_3$ of the above-given meaning as a further substituent in the pyridine portion of the heterocyclic nucleus, acylated derivatives and salts thereof, comprises treating pyrido[2,3-e]-thiadiazine-1,1-dioxides of the formulae:

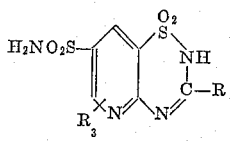

or

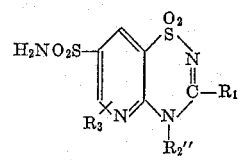

in which $R_1$, $R_2''$ and $R_3$ have the above-given meaning, or salts thereof with a reagent capable of reducing the C=N-double bond of the 1,2,4-thiadiazine-1,1-dioxide portion, and, if desired, carrying out the optional steps.

The conversion of the C=N-double bond may be achieved by hydrogenation, for example, by treatment with a hydride capable of reducing such bond. The preferred reagents are alkali metal borohydrides, e.g. lithium, potassium or, particularly, sodium borohydride. Such hydrides are used in the presence of a solvent, for example, a dilute aqueous or lower alkanol, e.g. methanol or ethanol, solution of an alkali metal hydroxide, e.g. lithium, sodium or potassium hydroxide; a lower alkanol, e.g. methanol or ethanol; an ether, e.g. diethyleneglycol dimethylether; or a liquid carboxylic acid amide, such as a formamide, e.g. formamide or dimethylformamide. The reduction is carried out at room temperature or at an elevated temperature, if necessary, in the atmosphere of an inert gas such as nitrogen. The removal of the C=N double bond in the 1,2,4-thiadiazine-1,1-dioxide ring may also be carried out by electrolytic reduction according to standard procedures.

A preferred embodiment of this process represents treatment of a 3-$R_1$-4-$R_2''$-6-lower alkyl-7-sulfamyl-pyrido[2,3-e]-1,2,4-thiadiazine-1,1-dioxide or a 3-$R_1$-4-$R_2''$ - 6 - halogeno - 7 - sulfamyl - pyrido[2,3-e] - 1,2,4-thiadiazine-1,1-dioxide, in which $R_1$ stands for hydrogen, lower alkyl, halogeno-lower alkyl, monocyclic carbocyclic aryl or monocyclic carbocyclic aryl-lower alkyl, and $R_2''$ represents hydrogen or lower alkyl, with an alkali metal borohydride in an alkaline medium to produce the preferred group of 3,4-dihydro-2H-pyrido[2,3-e]-1,2,4-thiadiazine-1,1-dioxide compounds. For example, the 6-methyl-7-sulfamyl-3,4-dihydro-2H-pyrido[2,3-e] - 1,2,4-thiadiazine-1,1-dioxide is prepared by treating 6-methyl-7 - sulfamyl - pyrido[2,3-e] - 1,2,4 - thiadiazine - 1,1-dioxide with sodium borohydride in the presence of aqueous alkali metal hydroxide, e.g. sodium or potassium hydroxide.

The starting material in the above reaction may be prepared, for example, by treatment of a 2-(N-$R_2''$-amino)-($R_3$)pyridine, in which the 3-position is unoccupied, and in which $R_2''$ and $R_3$ have the above-given meaning, with chlorosulfonic acid. The resulting 2-(N-$R_2''$-amino)-($R_3$)pyridine-disulfonyl chlorides, in which one of the sulfonyl chloride groups is in the 3-position, are subsequently reacted with ammonia, for example, in liquid or gaseous form, or in an aqueous solution or a lower alkanol, e.g. methanol or ethanol solution.

The resulting 2-(N-$R_2''$-amino)-disulfamyl-($R_3$)pyridines, in which one of the sulfamyl groups is located in the 3-position, and $R_2''$ and $R_3$ have the above-indicated meaning, are then reacted with formic acid, formamide or a lower alkyl orthoformate to form the desired pyrido[2,3-e]-1,2,4-thiadiazine-1,1-dioxide compounds, which contain no substituent in the 3-position. Or, a 2-(N-$R_2''$-amino)-$R_3$-pyridine-disulfonyl chloride, in which one of the sulfonyl chloride groups is located in the 3-position and $R_2''$ and $R_3$ have the previously indicated meaning, may be treated with an acid of the formula $R_1$—COOH, in which $R_1$ has the previously indicated meaning, i.e. hydrogen, a lower aliphatic hydrocarbon, a carbocyclic aryl, a carbocyclic aryl-lower aliphatic hydrocarbon, a heterocyclic or a heterocyclic-lower hydrocarbon radical, or a reactive functional derivative of such acid. Such reactive derivatives are capable of forming amide bonds and are especially acid halides, e.g. chlorides, or the corresponding anhydrides. The resulting N-acylated pyridine compounds are then ring closed with ammonia, used in gaseous or liquid form, or in an aqueous or lower alkanolic, e.g. methanolic or ethanolic, solution to the desired 3-$R_1$-4-$R_2''$-2H-pyrido[2,3-e]-1,2,4-thiadiazine-1,1-dioxides, in which $R_1$ and $R_2''$ have the above-given meaning.

In resulting 3,4-dihydro-2H-pyrido[2,3-e]-1,2,4-thiadiazine-1,1-dioxides, containing sulfamyl-nitrogen atoms with hydrogen, such hydrogen atoms may be replaced by hydrocarbon. This may be achieved according to procedures known for substituting a nitrogen atom, particularly the nitrogen atom of a sulfamyl group. Thus, lower alkyl radicals, e.g. ethyl, or especially methyl, may be introduced, for example, by reacting a solution of a 3,4-dihydro-2H-pyrido[2,3-e]-1,2,4-thiadiazine-1,1-dioxide in aqueous alkali metal hydroxide, e.g. lithium, sodium or potassium hydroxide, with a di-lower alkyl sulfate, e.g. dimethyl sulfate or diethyl sulfate. This reaction may be carried out, if desired, at an elevated temperature and/or at an increased pressure. Mono- or poly-substituted products may be formed depending on the conditions and/or the molar ratios.

A resulting 3,4-dihydro-2H-pyrido[2,3-e]-1,2,4-thiadiazine-1,1-dioxide may be acylated according to procedures used for the preparation of N-acyl derivatives. Thus, by treating a 3,4-dihydro-2H-pyrido[2,3-e]-1,2,4-thiadiazine-1,1-dioxide with a reactive functional derivative of a carboxylic acid, such as a halide, e.g. chloride, or an anhydride, mono- or poly-acylated products may be obtained. The reaction may be carried out according to known conditions, for example, in the absence or presence of a condensing reagent, such as a liquid organic base, for example, a tri-lower alkyl-amine, e.g. trimethylamine or triethylamine, or a pyridine derivative, e.g. pyridine or collidine, particularly if an anhydride, e.g. acetic acid anhydride is used, or by using a metal salt, such as the silver salt or an alkali metal, e.g. sodium, salt of the 3,4-dihydro-2H-pyrido[2,3-e]-1,2,4-thiadiazine-1,1-dioxide, for example, if an acid halide is used. Solvents are preferably anhydrous organic solvents, such as, for example, lower aliphatic ketones, e.g. acetone. Liquid basic condensing reagents, such as, for example, pyridine or collidine, may simultaneously serve as solvents. A liquid acylation reagent, such as, for example, acetic acid anhydride, may be used without an additional solvent. Depending on the conditions and/or the molar ratios, mono- or poly-acylated products may be obtained.

Depending on the conditions of the reaction, the re-resulting product may be obtained as the free compound or as a salt thereof. An alkali metal salt may be converted into the free compound by treatment with an aqueous acidic reagent, such as a mineral acid, for example, hydrohalic acid, e.g. hydrochloric acid, or sulfuric acid. A free compound may be converted into an alkali metal salt, for example, by treatment with an alkali metal hydroxide, e.g. sodium or potassium hydroxide, in a solvent, such as in a lower alkanol, e.g. methanol or ethanol, or in water and evaporating the solvent; or by reacting the free compound, for example, in an ether, e.g. p-dioxane or diethyleneglycol dimethylether, solution, with an alkali metal hydride or amide, e.g. sodium or potassium hydride or amide, and removing the solvent. Mono- or polysalts may be obtained.

Any resulting racemate may be converted into the antipodes thereof according to the methods used for resolving racemates.

The invention also comprises any modification of the general process wherein a compound obtainable as an intermediate at any stage of the process is used as starting material and the remaining step(s) of the process is (are) carried out, as well as any new intermediates.

The following examples illustrate the invention; they are not to be construed as being limitations thereon. Temperatures are given in degrees centigrade.

Example 1

A solution of 2.5 g. of 6-methyl-7-sulfamyl-pyrido-[2,3-e]-1,2,4-thiadiazine-1,1-dioxide in 110 ml. of methanol, 30 ml. of water and 2 ml. of 2 N aqueous sodium hydroxide is treated with 0.6 g. of sodium borohydride at room temperature. The reaction mixture is allowed to stand for 1½ hours; after concentrating under reduced pressure to about 30 ml. and cooling 4 ml. of 1 N aqeuous hydrochloric acid is added. The 6-methyl-7-sulfamyl-3,4-dihydro-2H-pyrido[2,3-e]-1,2,4-thiadiazine-1,1-dioxide crystallizes, M.P. 265–267°; yield: 0.7 g.

The starting material used in the above reaction may be prepared as follows: 10.8 g. of 2-amino-6-methyl-pyridine is added slowly to 100 ml. of chlorosulfonic acid while cooling at 5–10°. 85 g. of sodium chloride is added gradually at room temperature and the reaction mixture is then heated to 200° and kept at that temperature for one hour. After cooling a mixture of ice and water is added and the resulting solid product is filtered off which is dissolved in ether and the organic solvent is evaporated after filtration. 5.1 g. of 2-amino-6-methyl-pyridine-3,5-disulfonyl chloride, M.P. 118–121°, is obtained.

5.0 g. of this material is added to 50 ml. of concentrated aqueous ammonia, and the reaction mixture is heated on the steam bath for 30 minutes. After cooling the 2-amino-6-methyl-3,5-disulfamyl-pyridine crystallizes, is filtered off and and recrystallized from water, M.P. 249–251°; yield: 1.55 g.

A mixture of 1.3 g. of 2-amino-6-methyl-3,5-disulfamyl-pyridine and 20 ml. of formic acid is refluxed for 17½ hours. After cooling the product crystallizes, is filtered from water to give 6-methyl-7-sulfamyl-pyrido[2,3-e]-1,2,4-thiadiazine-1,1-dioxide, melting at 316° (with decomposition); yield: 0.5 g.

The 6-bromo-7-sulfamyl-3,4-dihydro-2H-pyrido[2,3-e]-1,2,4-thiadiazine-1,1-dioxide may be obtained as follows: By reacting 2-amino-6-bromo-3,5-disulfamyl-pyridine, prepared from 2-amino-6-bromo-pyridine by chlorosulfonation and subsequent amidation of the 2-amino-6-bromo-pyridine-3,5-disulfonyl chloride with ammonia, with ethyl orthoformate the 6-bromo-7-sulfamyl-pyrido[2,3-e]-1,2,4-thiadiazine-1,1-dioxide can be prepared. Upon treatment with sodium borohydride according to the above given procedure the desired 6-bromo-7-sulfamy-3,4-dihydro-2H-pyrido[2,3-e]-1,2,4-thiadiazine-1,1-dioxide can be obtained.

Example 2

By hydrogenating 7-sulfamy-pyrido[2,3-e]-1,2,4-thiadiazine-1,1-dioxide with sodium borohydride according to the procedure given in Example 1, the 7-sulfamyl-3,4-dihydro-2H-pyrido[2,3-e]-1,2,4-thiadiazine-1,1-dioxide can be obtained.

The starting material for the preparation of the above-described compound may be obtained as follows: by substituting 9.4 g. of 2-amino-pyridine for the 2-amino-6-methyl-pyridine in Example 1 and proceeding as shown in that example, 2.1 g. of 2-amino-pyridine-3,5-disulfonyl chloride are obtained, M.P. 137–139°. Instead of using 2-amino-pyridine the corresponding 2-acetyl-amino-pyridine can be used in this reaction.

The resulting 2-amino-pyridine-3,5-disulfonyl chloride is added to 21 ml. of concentrated aqueous ammonia and heated on a steam bath for 15 minutes. After cooling an oil separates, the supernatant solution is decanted and the oil crystallizes to yield 0.7 g. of 2-amino-3,5-disulfamyl-pyridine. It melts at 232–234° after two recrystallizations from water.

A mixture of 0.75 g. of 2-amino-3,5-disulfamyl-pyridine in 15 ml. of formic acid is refluxed for 21½ hours. A crystalline product is obtained after cooling and is filtered off. The 7-sulfamyl-pyrido[2,3-e]-1,2,4-thiadiazine-1,1-dioxide is recrystallized from water, M.P. 323–325°; yield: 0.4 g.

Example 3

The 3,6-dimethyl-7-sulfamyl-pyrido[2,3-e]-1,2,4-thiadiazine-1,1-dioxide is treated with sodium borohydride as shown in Example 1 to yield the desired 3,6-dimethyl-7-sulfamyl-3,4-dihydroxy-2H-pyrido[2,3-e]-1,2,4-thiadiazine-1,1-dioxide.

The starting material may be prepared as follows: 2-amino-6-methyl-pyridine-3,5-disulfonyl chloride is acylated with acetic acid anhydride to the 2-(N-acetyl-amino)-6-methyl-pyridine-3,5-disulfonyl chloride which is then ring closed by heating a solution of the latter in concentrated aqueous ammonia on a steam bath to yield the 3,6-dimethyl-7-sulfamyl-pyrido[2,3-e]-1,2,4-thiadiazine-1,1-dioxide.

An additional process for the preparation of the 3,4-dihydro-2H-pyrido[2,3-e]-1,2,4-thiadiazine-1,1-dioxides, which contain a sulfamyl group, and, preferably another substituent in the pyridine portion of the heterocyclic nucleus, comprises treating a 2-(N-$R_2''$-amino)-disulfamyl-pyridine compound, in which at least one of the sulfamyl groups is in 3-position and which may preferably contain an additional substituent in the pyridine nucleus, with an aldehyde. For example, the 7-(N-$R_2'''$-sulfamyl)-2-$R_2''$-3-$R_1$-4-$R_2''$-3,4-dihydro-2H-pyrido[2,3-e]-1,2,4-thiadiazine-1,1-dioxides, in which $R_1$, $R_2'$, $R_2''$ and $R_2'''$ have the above-given meaning, and in which the pyridine portion of the heterocyclic nucleus may contain $R_3$ of the above-given meaning as a further substituent, may be prepared by treating an aniline compound of the formula:

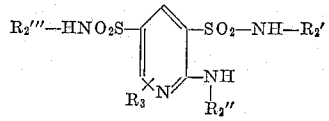

in which $R_2'$, $R_2''$, $R_2'''$ and $R_3$ have the above-given meaning, with an aldehyde of the formula $R_1$CHO, in which $R_1$ has the above-given meaning, and, if desired, carrying out the optional steps.

Preferably, the aldehyde is reacted with the pyridine derivative in about stoichiometric amounts. If desired, a small amount of an acid, particularly a mineral acid, such as a hydrohalic acid, e.g. hydrochloric or hydrobromic acid, or sulfuric acid, or a small amount of a base such as an alkali metal hydroxide, e.g. lithium, sodium or potassium hydroxide may be present. The aldehyde may also be given into the reaction medium in a form which yields the desired reactant in situ. Thus, for example, when formaldehyde is used as the reactant, it may be desirable to use it in the form of a polymer, such as paraformaldehyde or trioxane, or as an acetal, such as dimethoxymethane or diethoxymethane. Other aldehydes may be used as acetals, such as 1,1-dimethoxy-ethane or 1,1-diethoxy-ethane. In such case the presence of an acid is required to convert the polymeric form or the acetal of the aldehyde into the desired reactant.

The reaction may be carried out in the absence or preferably in the presence of a solvent, for example, an ether, e.g. p-dioxane or diethyleneglycol dimethylether; a lower alkanol, e.g. ethanol, propanol or isopropanol; or a formamide, e.g. dimethylformamide. It may be completed at an elevated temperature, for example, at the boiling temperature of the solvent. Thus, the aldehyde reactant is, for example, added to a preheated solution of the pyridine derivative, heating may then be continued to complete the reaction. If necessary, the reaction may be performed under increased pressure or in the atmosphere of an inert gas, e.g. nitrogen.

Illustrating this generally applicable process is the treatment of a 6-lower alkyl-2-(N-$R_2''$-amino)-3-(N-$R_2'$-sulfamyl)-5-(N-$R_2'''$-sulfamyl)-pyridine, or a 6-halogeno-2-(N-$R_2''$-amino)-3-(N-$R_2'$-sulfamyl)-5-(N-$R_2'''$-sulfamyl)-pyridine, in which each of the radicals $R_2'$, $R_2''$ and $R_2'''$ represents hydrogen or lower alkyl, with an aldehyde of the formula $R_1$—CHO, in which $R_1$ represents hydrogen, lower alkyl, halogeno-lower alkyl, monocyclic carbocyclic aryl or monocyclic carbocyclic aryl-lower alkyl, or a derivative thereof and, if desired, in the presence of a small amount of a mineral acid, to form the 2-$R_2'$-3-$R_1$-4-$R_2''$-6-lower alkyl-7-(N-$R_2'''$-sulfamyl)-3,4-dihydro-2H-pyrido[2,3-e]-1,2,4-thiadiazine-1,1-dioxide, or the 2-$R_2'$-3-$R_1$-4-$R_2''$-6-halogeno-7-(N-$R_2'''$-sulfamyl)-3,4-dihydro-2H-pyrido[2,3-e]-1,2,4-thiadiazine-1,1-dioxide, respectively, in which $R_1$, $R_2'$, $R_2''$ and $R_2'''$ have the above-given preferred meaning. For example, the 6-methyl-7-sulfamyl-5-aza-3,4-dihydro-2H-pyrido[2,3-e]-1,2,4-thiadiazine-1,1-dioxide may be prepared by reacting 2-amino-3,5-disulfamyl-6-methyl-pyridine with an about equivalent amount of paraformaldehyde or aqueous formaldehyde in the presence of a small amount of hydrochloric acid.

The starting materials used in the above-described reactions may be prepared, for example, by treatment of a 2-(N-$R_2''$-amino)-($R_3$)pyridine, in which the 3-position is unoccupied, and in which $R_2''$ and $R_3$ have the above-given meaning, with chlorosulfonic acid. The resulting 2-(N-$R_2''$-amino)-($R_3$)pyridinedisulfonyl chlorides, in which one of the sulfonyl chloride groups is in the 3-position are subsequently reacted with ammonia, preferably in the form of aqueous ammonium hydroxide or liquid ammonia, or with a primary amine, for example, a lower aliphatic amine, such as, for example, a lower alkylamine, e.g. methylamine, ethylamine, propylamine or isopropylamine; a substituted lower aliphatic amine, such as, for example, a hydroxy-lower alkylamine, e.g. 2-hydroxyethylamine.

What is claimed is:

1. A member of the group consisting of 2-$R_2'$-3-$R_1$-4-$R_2''$-6-$R_3$-7-(N-$R_2'''$-sulfamyl)-3,4-dihydro-2H-pyrido[2,3-e]-1,2,4-thiadiazine-1,1-dioxide, in which $R_1$ stands for a member of the group consisting of hydrogen, lower alkyl, chloro-lower alkyl, bromo-lower alkyl, phenyl, chloro-phenyl, bromo-phenyl, lower alkoxy-phenyl, lower alkyl-phenyl, phenyl-lower alkyl, chlorobenzyl, bromo-benzyl, lower alkoxy-benzyl and lower alkyl-benzyl, each of the radicals $R_2'$, $R_2''$ and $R_2'''$ represents a member of the group consisting of hydrogen and lower alkyl, and $R_3$ stands for a member of the group consisting of lower alkyl and halogen, the lower alkanoic acid acyl derivatives thereof and the alkali metal salts thereof.

2. 6-lower alkyl-7-sulfamyl-3,4-dihydro-2H-pyrido[2,3-e]-1,2,4-thiadiazine-1,1-dioxide.

3. 6-methyl-7-sulfamyl-3,4-dihydro-2H-pyrido[2,3-e]-1,2,4-thiadizaine-1,1-dioxide.

4. 3,6-di-lower alkyl-7-sulfamyl-3,4-dihydro-2H-pyrido[2,3-e]-1,2,4-thiadiazine-1,1-dioxide.

5. 3,6-dimethyl-7-sulfamyl-3,4-dihydro-2H-pyrido[2,3-e]-1,2,4-thiadiazine-1,1-dioxide.

6. 6-chloro-7-sulfamyl-3,4-dihydro-2H-pyrido[2,3-e]1,2,4-thiadiazine-1,1-dioxide.

7. 6-bromo-7-sulfamyl-3,4-dihydro-2H-pyrido[2,3-e]-1,2,4-thiadiazine-1,1-dioxide.

8. Process for the preparation of a member of the group consisting of 3-$R_1$-4-$R_2''$-6-$R_3$-7-sulfamyl-3,4-dihydro-2H-pyrido[2,3-e]-1,2,4-thiadiazine-1,1-dioxide, in which $R_1$ represents a member of the group consisting of hydrogen, lower alkyl, chloro-lower alkyl, phenyl, bromo-lower alkyl, chloro-phenyl, lower alkoxy-phenyl, lower alkyl-phenyl, phenyl-lower alkyl, chlorobenzyl, bromo-benzyl, lower alkoxy-benzyl and lower alkyl-benzyl, $R_2''$ represents a member of the group consisting of hydrogen and lower alkyl, and $R_3$ a member of the group consisting of lower alkyl, chloro and bromo, which comprises treating a 3-$R_1$-4-$R_2''$-6-$R_3$-7-sulfamyl-pyrido[2,3-e]-1,2,4-thiadiazine-1,1-dioxide, in which $R_1$, $R_2''$ and $R_3$ have the above-given meaning, with an alkali metal borohydride hydrogenating reagent.

9. Process according to claim 8, which comprises using sodium borohydride as a hydrogenation reagent.

References Cited in the file of this patent

FOREIGN PATENTS 557,149   Belgium _____ Aug. or Nov. 1957

OTHER REFERENCES

Fieser et al.. Organic Chemistry (1950), page 847 (2nd edition), D. C. Heath and Company, Boston.

Freeman et al.: Jour. of Org. Chem., volume 16, 1951, pages 815–835.